Patented Oct. 24, 1939

2,177,389

UNITED STATES PATENT OFFICE 2,177,389

COLOR COATED SURFACING MATERIAL

Carl E. Hillers, Charlottesville, and Horatio L. Small, Esmont, Va., assignors to Blue Ridge Slate Corporation, Charlottesville, Va., a corporation of Virginia No Drawing. Application October 23, 1936, Serial No. 107,150

1 Claim. (Cl. 91—70)

The present invention relates to new and useful improvements in a color coated surfacing material particularly adapted for use on asphalt roofing, and methods of producing the same.

In the copending application of Carl E. Hillers, Serial No. 50,155, filed November 16, 1935, a method is described of coating granular material with barium fluosilicate, either directly or by its formation in situ from, for example, barium carbonate and hydrofluosilicic acid, and an aqueous dispersion of sodium silicate and coloring matter.

In accordance with the present invention as distinguished from that described in said application, higher temperatures are used for setting the coating, and the process is practiced with certain preferred equipment, and provision is made to overcome the objectionable effects of drying at higher temperatures.

The object of the present invention is a more rapid commercial process, the product of which is free from objectionable qualities.

When mineral granules are coated with barium fluosilicate and subsequently mixed with sodium silicate and coloring matter, the formation of a weather resistant colored coating is practically instantaneously accomplished at a temperature of 500° F. or higher. The formation of the coating requires only a few minutes at 400° F., about 15 minutes at temperatures between 250° and 300° F., and somewhat longer in the temperature range of 200 to 220° F. It will be understood the above mentioned time periods are approximations only, and will vary with the rate of air circulation, concentration of water vapor in the surrounding gas, etc. The noteworthy points are that under similar conditions sodium silicate coatings which have been applied to granular material are not rendered weather resistant, except when applied to a limited group of granular materials, and that the sparingly soluble barium fluosilicate can render the coating weather resistant on practically any granule base.

The coatings produced by drying at elevated temperatures possess some characteristics different from those obtained by drying in the range of 60° F. to 120° F. When dried or set at a temperature of 200-300° approximately, the coatings have greater efflorescing tendency than when dried either at low temperatures or at high temperatures (above 700-800° F.). At the high temperatures mentioned efflorescence is practically entirely absent, indicating that the residual coating cannot be considered a dehydrated sodium silicate film, since the efflorescing tendency is a characteristic of such films when dried under similar conditions.

Efflorescence appears to reach a maximum in coatings produced from barium fluosilicate and aqueous sodium silicate when the drying is conducted in the temperature range 150-300° F. Although this temperature range would thus appear to be one which should be avoided, it possesses certain features which make the efflorescing characteristic less objectionable. A number of coloring agents which resist weather can be used in this temperature range and cannot be heated to higher temperatures without undergoing more or less loss of color value. This temperature range is, therefore, quite useful in commercial operation for setting colored coatings produced by the method of this application, if the efflorescing tendency can be minimized. This can be accomplished by soaking the granules, after the colored coating has been set, in water or dilute acid and then rinsing and drying them. Or, after the colored coating has been set, the granules may be treated either cold or while warm with a limited amount of aqueous or acidified aqueous solution of cupric chloride, ferric chloride, chromic chloride or similar materials. In the last mentioned case the efflorescing tendency is minimized, frequently with the avoidance of a separate drying step, if the granules are sufficiently warm to evaporate, per ton of granules, 40 to 50 pounds of a 10-20% solution of the agents mentioned. Furthermore, by proper selection of the agent used for the particular colored granules to be thus treated, it is possible to minimize the color effect of the agent upon the colored granules. For example, ferric chloride is more suitable for tans and reds, copper chloride for blues or greens, chromic fluoride for greens. These efflorescence reducing agents may also be used upon granules which have been heated to lower or higher temperatures than the range 150-300° F.

The heat treatments may be practiced by using various types of commercial devices. An oil-fired inclined rotary kiln may be used, but more intense colors can usually be obtained if the coated granules are allowed to fall through a heated tower of the type described in the copending application of H. L. Small, Serial No. 102,518 filed September 25, 1936. As disclosed in said application Serial No. 102,518 the process of heating consists in raising the coated granules to an elevated point and introducing them at or near the top of a tower which contains heated fluid, usually air. The free-fall of the granules is interrupted by baffles, so that usually from ten to fifteen seconds are required for the granular material to traverse the height of the tower, during which time the granules are exposed to the hot fluid. Obviously, other types of heating equipment commonly employed for heat treating granular material such as batch furnaces, either rotary or stationary, or conveyor heaters, etc., may be used in practicing this invention.

Nothing in the foregoing discussion is intended to preclude the application of the coating materials in two or more complete coating operations, instead of one operation; for example, and this applies both to the foregoing discussion and subsequent examples, the total amount of each material may be divided into two portions and applied to the granules in two operations with a separate heat treatment after the first operation.

As illustrations of the operation of this invention, the following examples are cited:

(1) Five hundred pounds of slate granules are introduced into a mixing device consisting of a revolving pan with an oppositely rotating star arrangement of mixing blades or plows and mullers. To this is added four pounds of powdered barium fluosilicate, and the materials are mixed for a period of fifteen to thirty seconds, or until the individual slate particles are thoroughly and uniformly covered with barium fluosilicate. Then, usually without interrupting the mixing action, thirty pounds of paint is introduced and the mixing is continued for a period of one to three minutes. The paint mentioned preferably comprises twenty-five pounds of sodium silicate solution of specific gravity 1.4, and factor $1Na_2O$ to $3.3SiO_2$, three pounds of chrome oxide, and two pounds of water which have been previously well mixed together. It is preferable, though not absolutely necessary, to introduce this paint into the mixer at several points simultaneously.

At the end of the mixing period the wet coated granules are discharged from the mixer and conveyed to the heating device where they are subjected to a temperature of 280–300° F. Upon being discharged from the heating device or after the heat treated granules have cooled down to a temperature of 220° F., the granules are introduced into a mixing device, such as a mixing conveyor, where they are uniformly brought into contact with a 10% solution of cupric chloride acidulated with hydrochloric acid, the solution being fed to the granules at the rate of about forty-five pounds per ton, and the two being mixed together sufficiently to wet all the surfaces of all the granules. Excessive mixing is to be avoided. The latent heat contained in the granules is usually then sufficient to evaporate all the water and to produce dry granules with a temperature of approximately 140°.

(2) Five hundred pounds of slate granules, four pounds of barium fluosilicate, and twenty-seven pounds of paint are introduced into the mixing device mentioned in the above example, and mixed as there described. The paint may be made from the same materials mentioned in the foregoing example, or may be produced by mixing twenty-two pounds of sodium silicate solution, three pounds of chrome oxide and two pounds of water. Upon discharging from the mixing device, the granules are conveyed to the top and introduced into the tower heater where they are subjected to contact with fluid at a temperature of 800° F. The heated granules, upon being discharged from the tower heater, may be cooled in piles, or any of the commercial devices used for that purpose.

(3) Five hundred pounds of trap rock granules and three pounds of barium fluosilicate are introduced into the revolving pan mixing device of Example (1), and are mixed together until the trap rock granules are fairly uniformly coated with barium fluosilicate powder. Then 23.5 pounds of paint is introduced and the mixing is continued until the granule surfaces are uniformly covered. The paint in this case consists of an intimate mixture of nineteen pounds of sodium silicate solution, three pounds of ultramarine blue and 1.5 pounds of water. At the end of the mixing period the wet colored granules are discharged from the mixing device, conveyed to the top of and introduced into the tower heater, where they are subjected to contact with a fluid at a temperature of 500° F. Upon being discharged from the heater the granules are cooled to a temperature of 120° F. or lower and then introduced into an amount of water sufficient to cover all the granules. After soaking for fifteen minutes or longer the granules are rinsed free from the soaking water by several applications of fresh water. Following this rinsing the granules are dried.

Although we have specifically mentioned sodium silicate solution of a definite specific gravity and factor in the foregoing examples, it is unnecessary rigidly to adhere to that particular solution, since sodium silicates of other factors and concentration may be used. Potassium silicate solutions may be used instead of sodium silicate solutions.

Mixtures of sodium silicate solution and potassium silicate solution may be used in place of a silicate solution containing only one alkali metal. The speeds with which silicate solutions of these two alkali metals combine with barium fluosilicate are slightly different, and likewise the efflorescing tendency of coatings produced by the process of this invention varies with the alkali metal silicate used.

The exact chemical reactions which occur during the mixing, aging and heating of granules coated by the process of this invention are complex and not thoroughly understood. However, the following results have been observed and they indicate that several factors may affect efflorescing and weather resistance of the coatings. If wet color coated granules of the type described in the examples are slowly air dried in a humid atmosphere, the coatings possess weather resistance. If the moisture of the coating is removed rapidly at room temperature and humidity conditions, as by blowing the granules dry before a fan, the coating has little or no weather resistance, but if these fan-dried granules are subsequently exposed long enough to a very humid atmosphere, the coating becomes weather resistant. Moisture and time are therefore essential for the insolubilizing of the alkali metal silicate by the barium fluosilicate, and alkali metal fluoride and barium silicate and/or fluoride are undoubtedly formed to a certain extent at the points of contact, since these and silica or silicic acid might be expected to be the normal products of chemical reaction in an alkaline aqueous medium. The coating may also contain some undecomposed barium fluosilicate and/or alkali metal silicate. When the moisture is driven off too rapidly to allow the foregoing reaction to proceed sufficiently far to insolubilize the coating, we must have largely or predominantly the starting chemical compounds in the dry coating. The effect of heat, therefore, may vary with the condition of the coating at the time the heat is applied, and the chemical composition of the heated coatings may likewise vary. On the other hand, the ultimate heated coating may be identical irrespective of the condition of the coating ingredients at the time the heat is applied, for it is possible that reaction between the starting coating materials may be rapid at elevated temperatures in the presence of amounts of moisture or water vapor insufficient to promote reaction at low temperatures. It is further possible that the reaction proceeds in a different manner or by different steps than those discussed, or that the course of the reaction as well as the final products may be different at different temperatures.

In view of the complexities involved and the further possibilities of chemical reaction between some of the starting materials or step reaction products and the granule base, the final coating can only be described as the heat reaction product of the starting materials, by which is to be understood that the wet coated granules may either be heated directly or aged before heating and that moisture conditions may be controlled or disregarded, and it is further to be understood that the process of the present invention is not to be limited by the foregoing attempts to explain what chemical changes may occur.

The final color or depth of color produced from wet coated granules may likewise vary with the rate at which the coating is dried, the amount of moisture present in the atmosphere or surroundings during the drying process, the length of ageing of the wet coated granules before heating, the temperature and atmospheric conditions under which the ageing is conducted, the maximum temperature of the heat treatment, the length of the heat treatment, the amount of abrasion induced by tumbling of the granules, etc. The efflorescing tendencies are likewise affected by most of the above variables.

In the examples, chrome oxide green and ultramarine blue were cited as coloring agents, but it is not intended to restrict the process to these colors, since iron oxide reds, browns, yellows, buffs, ochres, as well as other earth pigments, chromium hydroxide, zinc oxide, titanium oxide, lithopone, cobalt blues, chrome greens, metal powders, etc., may be used, with due consideration to the limitations of the pigmenting materials.

The colors of the above pigments may be modified if desired by mixtures of one or more of the above, or equivalents thereof, or powdered stone of many types may be used as modifiers or assistants. For example, silica, barytes, slate, blue stone, greenstone and other white or colored, powdered low cost materials may be used in the coating compositions of this invention.

Other material may be used as the granular base instead of the slate and trap rock mentioned in the examples. For instance, in granulated form we have successfully used the following as bases in the production of at least one color: quartz, crushed pebbles, quartzite, brick, fired shale, feldspar, greenstone and limestone, and in view of the versatility of the process of this invention, no limitations as to the mineral material we employ as the granule base are anticipated, providing the base is of itself sufficiently refractory, weather resistant and in other respects suited for surfacing roofing.

What we claim is:

The method of coloring granular material comprising the steps of: coating the granules with barium fluosilicate, an aqueous dispersion of alkali metal silicate and coloring agent; heating the granules; soaking the granules in water; rinsing the granules; and finally drying the granules.

CARL E. HILLERS.
HORATIO L. SMALL.